(12) United States Patent  
Germanakos et al.

(10) Patent No.: US 10,885,448 B2  
(45) Date of Patent: Jan. 5, 2021

(54) USABILITY DATA ANALYSIS PLATFORM

(71) Applicant: SAP SE, Walldorf (DE)

(72) Inventors: Panagiotis Germanakos, Wiesloch (DE); Ludwig Fichte, Ottawa (CA)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/427,662

(22) Filed: May 31, 2019

(65) Prior Publication Data

US 2020/0226479 A1 Jul. 16, 2020

Related U.S. Application Data

(60) Provisional application No. 62/791,466, filed on Jan. 11, 2019.

(51) Int. Cl.

| | | |
|---|---|---|
| *G06N 5/04* | (2006.01) | |
| *G06N 20/00* | (2019.01) | |
| *G06F 11/36* | (2006.01) | |
| *G06F 40/30* | (2020.01) | |

(52) U.S. Cl.  
CPC .......... *G06N 5/04* (2013.01); *G06F 11/3688* (2013.01); *G06F 40/30* (2020.01); *G06N 20/00* (2019.01)

(58) Field of Classification Search  
CPC ....... G06F 11/3692; G06F 40/30; G06N 5/04; G06N 20/00  
USPC ........................................................ 717/124  
See application file for complete search history.

(56) References Cited

U.S. PATENT DOCUMENTS

| | | | |
|---|---|---|---|
| 8,713,532 B2* | 4/2014 | Gogh ................. | G06F 11/3664 717/124 |
| 8,856,725 B1* | 10/2014 | Anderson ............. | G06F 8/75 717/103 |
| 9,201,646 B2* | 12/2015 | Balachandran ........... | G06F 8/71 |
| 10,379,992 B2* | 8/2019 | Fletcher ............... | G06F 11/362 |
| 10,585,780 B2* | 3/2020 | Woulfe .................... | G06F 8/75 |
| 2005/0097508 A1* | 5/2005 | Jacovi .................... | G06F 9/453 717/103 |
| 2006/0085245 A1* | 4/2006 | Takatsuka .......... | G06Q 10/0631 705/7.12 |
| 2007/0055656 A1* | 3/2007 | Tunstall-Pedoe ....... | G06F 40/40 |

(Continued)

OTHER PUBLICATIONS

Brooke, "SUS—A Quick and Dirty Usability Scale," Usability Evaluation in the Industry, Sep. 1996, pp. 189-194, 7 pages.

(Continued)

*Primary Examiner* — Lewis A Bullock, Jr.  
*Assistant Examiner* — Theodore E Hebert  
(74) *Attorney, Agent, or Firm* — Fish & Richardson P.C.

(57) ABSTRACT

This disclosure describes a platform and taxonomy for analyzing the results of testing data, such as data generated through usability test of the User Experience (UX) of a software product or service. The analysis outputs actions that can be performed automatically to modify the software product or service under test. The usability test results that are analyzed can include qualitative data, such as words, sentences, phrases, comments, and or other (e.g., natural language) information that have been provided by end-users engaged in the usability testing. The platform and taxonomy described herein provided a framework through which a semantic analysis of results can be performed, with actions performed based on the semantic analysis.

20 Claims, 10 Drawing Sheets

(56) References Cited

U.S. PATENT DOCUMENTS

| | | | |
|---|---|---|---|
| 2008/0320436 A1* | 12/2008 | Hughes | G06Q 10/06311 717/100 |
| 2009/0249299 A1* | 10/2009 | Farchi | G06F 11/3676 717/125 |
| 2009/0328004 A1* | 12/2009 | Balasubramanian | G06F 11/362 717/125 |
| 2010/0050160 A1* | 2/2010 | Balasubramanian | G06F 8/33 717/126 |
| 2017/0103402 A1* | 4/2017 | El-Diraby | G06N 5/04 |
| 2017/0109633 A1* | 4/2017 | Bai | G06F 40/258 |
| 2017/0236081 A1* | 8/2017 | Grady Smith | G06Q 10/067 705/7.36 |
| 2018/0113801 A1* | 4/2018 | Fletcher | G06F 8/60 |
| 2018/0129480 A1* | 5/2018 | Germanakos | G06F 8/20 |

OTHER PUBLICATIONS

Germanakos et al., "Eureka: Engineering Usability Research Empirical Knowledge and Artifacts," Learning and Collaboration Technologies, Development, and Technological Innovation, May 2018, 19 pages.

Keenan et al., "The Usability Problem Taxonomy: A Framework for Classification and Analysis," Empirical Software Engineering, vol. 4, Mar. 1999, pp. 71-104, 34 pages.

Youtube.com [online], Eureka Marketing: "Eureka—Your UX companion to data analysis," Jun. 18, 2018, [retrieved on Mar. 20, 2019], retrieved from: URL <https://youtu.be/x4_DGEBwhkc>, 3 pages (video submission with Transcript incl.).

* cited by examiner

USABILITY DATA ANALYSIS PLATFORM

CROSS-REFERENCE TO RELATED APPLICATION

The present disclosure is related to, and claims benefit of, U.S. Provisional Patent Application No. 62/791,466, titled "Usability Testing Analysis Platform," which was filed on Jan. 11, 2019, the entire contents of which are incorporated by reference into the present disclosure.

BACKGROUND

In software development and other environments, the User Experience (UX) of software solutions and services describes the quality of user interfaces and functionality (in terms of users' satisfaction, usability, etc.), as well as the ability of users to meet their expectations and accomplish their desired tasks easily and/or quickly, with minimal effort. To ensure a user-centered design approach to software development, and to ensure a quality UX, development teams may perform a series of usability (or UX) tests on software during its development and/or prior to release. Usability testing generates a large volume of empirical and unstructured data that needs to be analyzed to determine meaningful conclusions regarding the usability of the software being tested. Traditionally, there have been many ad hoc approaches and stand-alone practices for analyzing qualitative data output from usability testing. However, there has been a lack of standardized procedures for analysis of qualitative (e.g., fuzzy) user feedback provided during usability testing.

Usability testing can form a critical phase of a user-centered software design and development process. The usability testing phase can be a period of time when project teams can observe and measure the usability of their solutions and user interfaces in terms of visual design, interaction, functionality, terminology, content, scenario applicability, and/or other factors. During this phase, teams collect qualitative and quantitative data, or feedback items, that the teams may analyze and interpret to ensure that the delivered software product aligns with the needs of end-users.

SUMMARY

Implementations of the present disclosure are generally directed to systems, methods, and computer-readable media for analysis of data that is generated through the testing of software. More particularly, implementations of the present disclosure describe a platform and taxonomy for analyzing qualitative results of usability testing of a software product or service.

In general, implementations of innovative aspects of the subject matter described in this specification can be embodied in a method that includes the following operations: receiving input data generated through usability testing of software, the input data including comments created by end-users interacting with the software; generating one or more clusters of the comments, each cluster including a subset of the comments that are semantically similar; determining a role fit metric for each of the end-users, the role fit metric for a respective end-user indicating a degree of similarity between characteristics of the respective end-user and characteristics of a role; calculating, for each of the clusters, an importance metric for the respective cluster, wherein the importance metric is based on a proportion of the end-users that generated references to the comments in the respective cluster, and wherein the proportion is determined based on weighting each of the end-users according to the corresponding role fit metric; generating, for each of the clusters, one or more recommendations to address an issue described in the comments included in the respective cluster, wherein the one or more recommendations are generated based at least partly on the importance metric for the respective cluster; and providing the one or more recommendations through an interface. These and other implementations can each optionally include one or more of the following innovative aspects:

In some instances, the operations may further include determining a priority of addressing the issue associated with the respective cluster, the priority determined based on the importance metric of the respective cluster, wherein the one or more recommendations are based at least partly on the priority.

In some instances, the operations may further comprise determining an impact, to the software, of the issue associated with the respective cluster, wherein the one or more recommendations are based at least partly on the impact. In some of those instances, the impact is determined through at least one machine learning algorithm.

In some instances, providing the one or more recommendation through an interface includes presenting the one or more recommendations through a user interface.

In some instances, providing the one or more recommendation through an interface includes providing the one or more recommendations through at least one application programming interface (API) that is accessed by one or more services.

In some instances, the method further comprises generating a name for each cluster by applying natural language processing to the comments in the respective cluster.

In some instances, the method further comprises determining a usability issue type for each cluster by applying natural language processing to the comments in the respective cluster. In some of those instances, the method may further comprises determining a usability issue judgment for each usability issue type by applying natural language processing to the comments in the respective cluster.

In some instances, the method further comprises determining, for the respective cluster, one or more of an associated screen and an associated use case.

Other implementations of any of the above aspects include corresponding computing systems, apparatus, and/or computer programs that are configured to perform the method. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure are generally directed to systems, methods, and computer-readable media for qualitative, empirical data analysis through the definition and application of a taxonomy, referred to herein as EUREKATAX, the EUREKA taxonomy, or the taxonomy. In some implementations, provides a structure for organizing information that includes multiple (e.g., 52) items. The taxonomy is flexible enough to adapt to various situation-specific scenarios and contexts, producing outcomes that provide benefits for usability. The taxonomy provides for strong internal consistency of its hierarchies and high perceived fit of the items in the various classifications. The taxonomy is usable to generate comparable, generalizable and replicable results of usability tests, through qualitative data analysis that improves the UX and impact of software solutions.

Implementations of the present disclosure also provide a platform that employs the taxonomy. The platform is referred to herein as the EUREKA platform, or the platform. The platform provides an end-to-end Workflow-as-a-Service methodology and open tool for usability testing data analysis. It facilitates a guided expansive learning experience for development and/or testing teams through application of reasoning to the collected usability feedback, while also providing a balanced qualitative and quantitative perspective of the test results. The platform adds value to a testing process by optimizing outcomes compared to the effort invested for empirical data analysis, by providing a goal-directed, consistent, and flexible methodology. The platform also provides a modular tool that provides structured and semantically enriched content, and a smart data visualization overview.

The taxonomy enables a systematic and flexible organization of usability testing result information (e.g., opinions, behaviors, sentiments, ideas, experiences, etc.) and its transformation into actionable items that can be injected into the implementation plans of a software development team for improving the UX and quality of software designs and products.

Usability testing is considered a central phase of UX research and a common activity in the user-centered software design and development process. Project teams prepare and run a number of usability study sessions with end-users to validate the software under test by observing the end-users, asking questions, and/or gathering hard data. They collect feedback of how effective, efficient and satisfied the end-users are while executing the given tasks which include multi-purpose interactions with a user inter-face, (functional) prototype, real application, system or piece of software. The software under test can include any or all of these alternatives. Such feedback can be collected implicitly (with non-disruptive methods for the user) or explicitly (by asking questions), producing a number of feedback items. Implicit methods may include observation (e.g., what an end-user does with the testing environment; focusing on how he behaves using the different functionalities, how he navigates and reacts on the given tasks, how he searches, inputs data, or filters information, etc.), or specialized routines (quantitative methods based on key-metrics) that collect behavioral data as a result of users' inter-actions (e.g., time on task completion, errors, frequency of specific actions, screen flow navigation success case violation, time intervals between actions, etc.). Explicit methods can rely on the questions that the team asks an end-user during the execution of a task (e.g., might relate to more generic comments— what he liked and not, or more specific ones like ranking, voting, flagging or polling for a targeted topic), or post-session small-scale interviews and questionnaires that usually aim to gather the general impressions of end-users about the overall usability of a software. A combination of implicit and explicit feedback can be considered an ideal mixture of information (e.g., Mixed Methods Research) that can be collected for a task (or interaction) under investigation since each type of feedback covers the weaknesses of the other (e.g., explicit feedback may carry more subjective and biased messages, since it relies on users' opinion, as opposed to quantitative feedback, which is more objective but does not convey 'why' an end-user is navigating in a particular way), and together provide an integrated viewpoint with an added value greater than the sum of its parts. In some instances, the goal is to create an understanding as early as possible of the interaction challenges, cumbersome situations, needs or wishes that would improve a solution in terms of usability and user experience.

However, collecting, analyzing, sorting and making sense of the collected information is a time-consuming task that may require considerable effort. For quantitative data analysis, there are previously available computational techniques and algorithms that can produce a statistical, mathematical, or numerical result, which in turn may be aligned with the objectives of a study (by e.g., establishing associations between variables, detecting patterns, recognizing similarities and differences with historical events). In contrast, for qualitative data analysis, the previously available procedures (e.g., field studies, interviews and observation, focus groups, audio/video recordings, storytelling) and tools focus on how to gather the data and not on how to analyze them. Qualitative data present an inherent uncertainty and fuzziness increasing the possibility of drawing different understandings, explanations or interpretations, given that they cannot be easily reduced to numbers and usually express opinions, experiences, feelings, values and behaviors of people while acting in dynamic contexts. For example, a usability test with eight end-users might produce 130-150 feedback items of any nature. Often these data are unstructured, incomplete, inaccurate, and gathered in various formats creating an overwhelming situation for a team, since many times it is not clear how to start an analysis. Previous solutions lack a consistent methodology and tools that would guide project teams through qualitative data analysis in a collaborative manner, taking ad-vantage of the various roles' (e.g., User Researcher, Interaction and Visual Designer, Architect, Domain Expert, Product Owner, Developer) expertise and backgrounds usually involved in user-centered software development.

As used herein, a task is an action or a sequence of actions performed by the end-user in the software under test, to accomplish some end goal. A task is used as reference point to cross-reference the different results.

Implementations provide an end-to-end qualitative data analysis as a process that starts with a pre-phase actions that relate to data preparation, synthesis and cleaning, and ends with a post-phase that includes solutions discussion, recommendations and prioritization for future activities.

To this end, implementations provide the EUREKA platform and taxonomy as an end-to-end Workflow-as-a-Service methodology and tool for analyzing empirical data collected from various usability testing sessions. It is an open solution that can be applied in any suitable domain (e.g., educational, business) that involves the activity of usability testing of software products, tools, platforms, user interfaces, and so forth. The methodology increases the goal-directed learning experience and outcome. The generated knowledge is realized through the suggested modular tool for transforming the collected feedback into meaningful, semantically enriched and purposeful action items.

In many instances, development teams are faced with different levels of usability maturity. Usability testing often is not done as a service to an external client, but rather as part of software development. Thus, a collaborative approach not only during study execution, but also during study analysis, can be valuable from two perspectives. First, it may be important to minimize potential evaluator effects. Second, there may be the need to keep multiple team members, with different backgrounds and skill sets, engaged during all the steps of data analysis. Such an approach could be deemed beneficial in various levels for the successful data analysis and communication of the results, given that participants may be able to build up commitment towards potential findings and resulting solutions as well as to share their expertise towards the same objective, thus collaboratively learning from the end-users, their feedback, and each other.

The platform and taxonomy described herein provides an improved approach that could provide guidance and support through a highly synergetic environment during the analysis of the empirical data captured from the usability studies. These data represent a collection of multivariate observations, notes and testimonies either in paper or electronic format as they have been gathered during the user studies sessions. In user research activities like field studies and interviews, the analysis and outcome of the research data is more or less straight forward, since it follows processes, methods and templates that enable the classification of the data into the respective artifacts. Depending on the needs and requirements, a team might decide to create a persona, customer journey, activity flow, task analysis, day-in-life, or use case. However, in usability testing activities, the method or tool for data analysis may not be obvious given that it is highly situation-specific, driven by the data itself, and it informs a clustering approach. In some cases, the only solid reference point for the teams may be the validation scripts that frequently provide the means for evaluating the screens and interaction flows of a prototype, application or product based on a few scenarios and tasks that the end-user has to perform.

The platform and taxonomy provide a Workflow-as-a-Service methodology for guided exploratory analysis and expansive learning. In this respect, implementations provide a collaborative methodology that can provide the necessary guidance to the teams to analyze their empirical data but at the same time can maintain the adequate flexibility to be adapted to its status and needs, such as time constraints that might be imposed during the analysis due to the development cycles. In addition, implementations can provide the opportunity to maintain the consistency across the various process steps, to demonstrate and validate the impact during execution and allow room for generalization and multi-applicability (e.g. in the educational sector).

It is appreciated that implementations in accordance with the present disclosure can include any combination of the aspects and features described in this disclosure. That is, implementations in accordance with the present disclosure are not limited to the combinations of aspects and features specifically described in this disclosure, but also include any other appropriate combinations of the aspects and features provided.

The details of one or more implementations of the present disclosure are set forth in the accompanying drawings and the description. Other features and advantages of the present disclosure will be apparent from the description and drawings, and from the claims.

DETAILED DESCRIPTION

Figure 1:
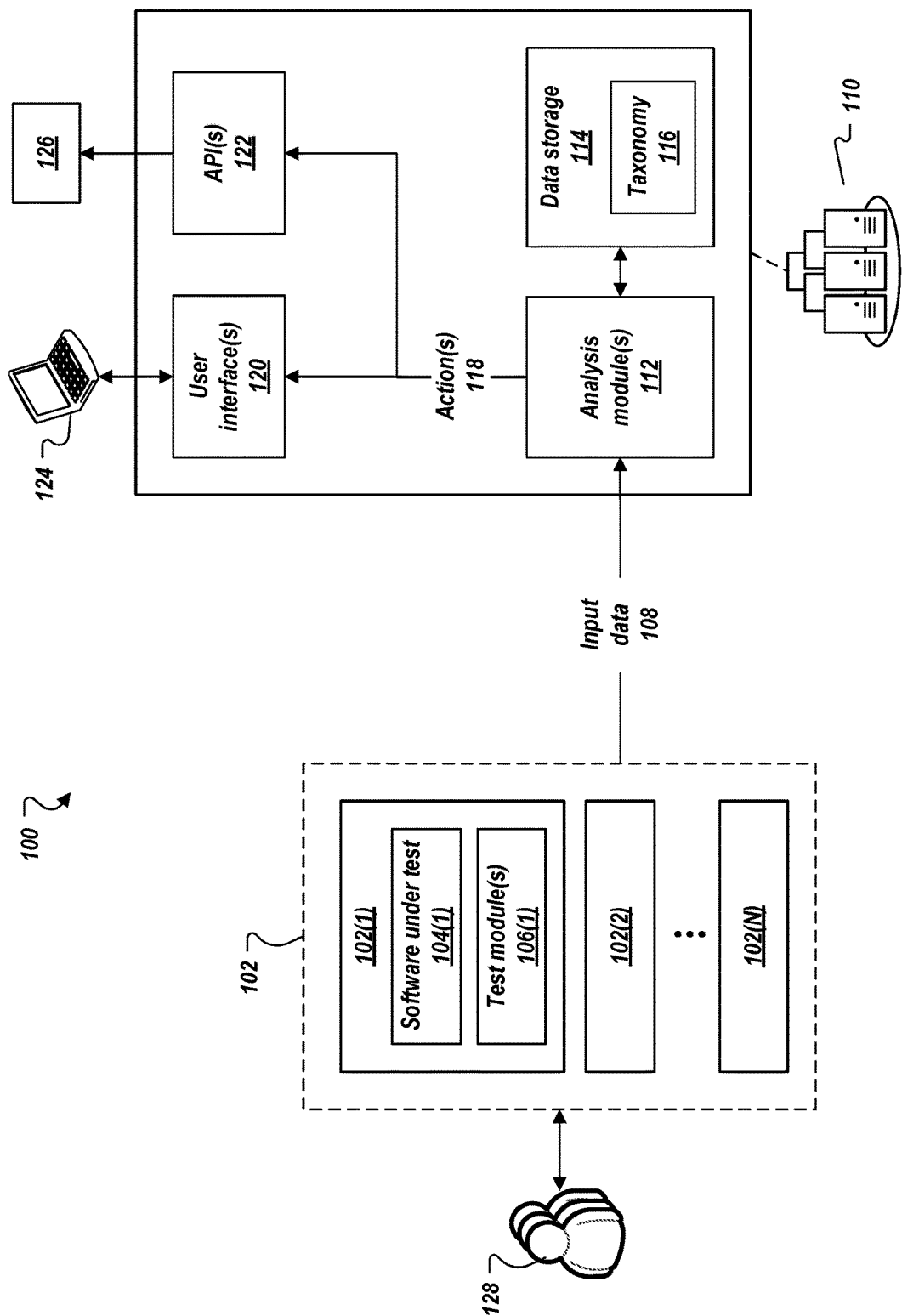
FIG. 1 shows an example system for performing usability test result analysis, according to implementations of the present disclosure.

This disclosure describes a platform and taxonomy for analyzing the results of testing data, such as data generated through usability test of the User Experience (UX) of a software product or service. The analysis outputs actions that can be performed automatically, and/or notifications that instruct individuals or other software systems to perform the actions. The usability test results that are analyzed can include qualitative data, such as words, sentences, phrases, comments, and or other (e.g., natural language (NL)) information that have been provided by end-users engaged is usability testing of a piece of software. Such data have traditionally been difficult to analyze given previously available tools. The platform and taxonomy described herein provide a framework through which a semantic understanding of results can be developed, and actions can be determined based on that semantic understanding.

In some implementations, the platform performs operations for classifying various end-users (e.g., individuals interacting with the software under test during usability testing) based on their characteristics and their experience on given interaction tasks with the software being tested, and determining their similarity (e.g., role fit) to one or more predefined persona profiles created by the development team. The predefined persona profiles may be prepared prior the test users' recruitment phase. The platform can adjust the importance of the qualitative UX testing output based on the degree of fit or matching of each end-user to a particular predefined persona profile. For example, various results generated by an end-user can be weighted based on the degree of similarity of the characteristics of the end-users to the characteristics included in a persona. Such characteristics can include requested skills, experience, goals, frequent tasks, and so forth. The similarity between the recruited end-user's (e.g., usability tester's) profile and the persona profile(s) may be determined (e.g., by a team) based on a degree of matching (or fit) of their characteristics. Matching may include or comprise matching actual, recruited end-users with an expected, or estimated, one as described above. In some instances, the actual end-users may include an end-user who tests the software using this described process (e.g., a testing end-user), as well as an end-user who will eventually use the commercially-made software after the testing phase is completed and corrections have been implemented. These end-users may be considered similar in some aspects, as the primary difference between them is the time the solution is used. One end-user may be involved earlier in the validations and the second one will use the final product.

The platform can collect and analyze feedback from multiple end-users, such as individuals who have been recruited to perform usability testing, and who belong to target group (e.g., a type of end-user). Given that the recruited individuals may not be an exact fit to the target group, implementations can adjust (e.g., weight) their test results (e.g., feedback) based on degree of closeness or fit to the target group. The closeness of an individual to a target group classification can be based on independently determined characteristics of the individual, either self-reported or determined through some other data source. Such characteristics can include the individual's role or job title, job responsibilities, and/or other information that is publicly available or self-reported by the individual. This fit determination is described further below.

The platform can analyze the test results data and output actionable items (actions) to be performed automatically or manually by operators. Such actions can include actions that are performed to improve the UX of software under test, such as changing the appearance or operation of user interface (UI) elements, fixing bugs, adding or removing features, and so forth. In some examples, a development team can receive from the platform a list of actions that can be prioritized and scheduled to be implemented in future versions of the software. The taxonomy-based analysis described herein operates within the platform that includes dashboards (UIs) for outputting the results of the analysis. The input data that is the usability testing results can be collected using various suitable tools and techniques. The results of the analysis (e.g., actions to be performed) can also be output through one or more application programming interfaces (APIs) to other systems, such as issue tracking software, source control systems, messaging systems, and so forth. Such systems may notify of the appropriate personnel of the actions to be taken or, in some instances, perform actions automatically.

UX can encompass a variety of concepts associated with the usability of a software system, such as desirability, accessibility, usefulness, whether a product is aesthetically pleasing, intuitive to use, and so forth. UX testing, also referred to herein as usability testing, can be performed on software that is a prototype, a component, and/or a functional system. UX testing can be applied to aspects of software that can be described as Key Performance Indicators (KPIs), and which can be evaluated through a series of usability tests that a product team may run during the validation phase of a (e.g., user-centered) design and/or software development process. A goal of usability testing is to validate a solution by measuring how effective, efficient, and satisfied the users are when interacting with specific tasks via the user interface (UI) of a software product or service, which provides the mechanisms enabling user interaction with the software.

Implementations provide a taxonomy, referred to as the EUREKA (Engineering Usability Research Empirical Knowledge and Artifacts) taxonomy, or EUREKATAX. As used herein, a taxonomy refers to a classification system that organizes information based on predetermined categories ordered in a particular way (as dictated by the taxonomy), and/or a classification system that classifies multifaceted, complex phenomena according to common conceptual domains and dimensions. A taxonomy can also be described as a language that communicates the understanding of a structured meaning of situation-specific matters, while also leveraging related expectations, knowledge, and experiences. In many instances, usability testing results in diverse results regarding an outcome, which can be subject to multiple (e.g., different) interpretations when examined using previously available methodologies. By applying the taxonomy described herein, implementations provide appropriate (e.g., shared) models to determine appropriate actions to improve UX, thus saving time and effort. Implementations also provide semantically enriched knowledge for describing transformed goal-directed feedback items, measurable outcomes, and value. This disclosure describes the construction, theoretical considerations, definition, and evaluation of the taxonomy for standardizing a more holistic process for empirical data analysis, which is able to adapt to the solution or the context at hand, and to maximize the outcome given the effort invested.

The taxonomy provides a construct and enumeration of qualitative data analysis aspects and attributes that can be used by project teams for exploring the information captured from their usability studies. It follows an iterative style of instruction and it enables easy access to a hierarchical organization of elements and relationships in a structured, non-redundant, and non-conflicting way. In some implementations, the taxonomy includes four layers (e.g., categories), and each one of them is progressively disclosed at various levels (e.g., depths) of detail refining a seed of information from the abstract to the concrete, thus enhancing the decision making and problem solving capabilities of the platform. Points of reference for the taxonomy are: the tasks, providing the minimum block of contextual information for an end-user and their interactions, and the feedback items, which represent the information extracted as a reaction to the observed tasks. These two concepts are fundamental qualities of the proposed taxonomy, and each analysis and discussion may take place with and for them as a combinatorial unit of evidence. The taxonomy represents a comprehensive paradigm that supports (either as a guide or as standalone categories and classifications) the extraction of insightful learning outcomes and meaningful action items through one or more refinement cycles during the qualitative data analysis process performed by the platform.

FIG. 1 shows an example system 100 for performing usability test result analysis, according to implementations of the present disclosure. As shown in the example of FIG. 1, the environment 100 can include any appropriate number of testing devices 102, such as devices 102(1), 102(2), . . . 102(N), where N is any appropriate number. Each device 102 can execute a software program or service that is being testing for usability, referred to as the software under test 104. Each device 102 can also execute testing software, such as one or more test modules 106 that capture information regarding the interactions of end-users 128 with the software under test 104 and/or feedback of the end-users 128 regarding the software under test 104. The test module(s) 106 can generate input data 108 that includes the feedback of the end-users 128 who act as usability or UX testers. The input data 108 can include feedback from the end-users 128, such as evaluations, comments, and/or other types of qualitative (e.g., text-based, NL) data evaluating the software under test 104.

The input data 108 can be communicated, over one or more networks, to analysis computing device(s) 110. The device(s) 110 can execute analysis module(s) 112 that analyze the input data to generate action(s) 118 that are recommended. The action(s) 118 may include action(s) to be performed to improve the usability of the software under test 104. The analysis module(s) 112 may perform the analysis using the taxonomy 116, as described further herein. The taxonomy 116 can be stored in data storage 114, which may be local to the device(s) 110 or external to the device(s) 110. The action(s) 118 can be output through UI(s) 120 to output device(s) 124. Operator(s) can use the device(s) 124 to access the action(s) 118 through the UI(s) 120. Action(s) 118 can also be output through API(s) 122 to one or more external software platforms or services 126, such as source control systems, issue tracking systems, messaging services, and so forth.

In some implementations, the analysis module(s) 112 may employ the taxonomy 116 to perform a qualitative data analysis as an iterative modular learning process that is extended across various cycles of development and learning outcomes, which can be described as zones of proximal development or cycles of expansive learning of participants. This can start with the construction of basic or simple pieces of information and develop to a more sophisticated amalgamation of information chunks regarding a specific topic.

The first level of the taxonomy can describe its main categories, e.g., as the higher level of abstraction of the predetermined organization of information. The taxonomy can include four different conceptual depths (e.g., cycles) of categories, which can provide a holistic understanding and knowledge of the qualitative data analysis process while at the same time acquiring or improving various related skills such as prioritization and formulation of action plans for analyzing certain types of feedback items. In the taxonomy, the goal-directed categories can include categories for Discover, Learn, Monitor, and Act. These categories can embody concepts (e.g., as interrelated layers) that define object, inner structure, boundaries, and a methodological guidance to proceed and analyze the feedback items to determine action items.

The different stages or cycles of the taxonomy (e.g., Discover, Learn, Monitor, and Act) can be mutually supportive, such that each one can feed the next with information following a logical sequence in the qualitative data analysis process. Hence, each cycle (or isolated classifications in one cycle) in the taxonomy may not represent a learning procedure on its own, but rather a progression towards the maximization of understanding and learning experience.

Moreover, vertical exploration within a stage reflects a perpendicular movement to each category for assigning different and more inclusive semantic meaning to a feedback item with respect to a task. The extracted knowledge follows a progressive transformational route combining the experiences and knowledge of the team members converting a feedback item from a global abstraction to a concrete fact with a specific meaning and associations. Thus, each depth can produce a semantic transformation of a feedback item leading to the next depth of realization or a standalone interpretation with a more limited scope. Subsequently, in the taxonomy the various categories can be decomposed in different classifications as follows. Each category can be decomposed into sub-categories (e.g., different, standalone, purposeful classifications, with specific input and output), and in turn into operations (e.g., describing functions towards realizing the various sub-categories in a specific context, situation or location). The operations can include several properties (e.g., specific characteristics or qualities).

Figure 2:
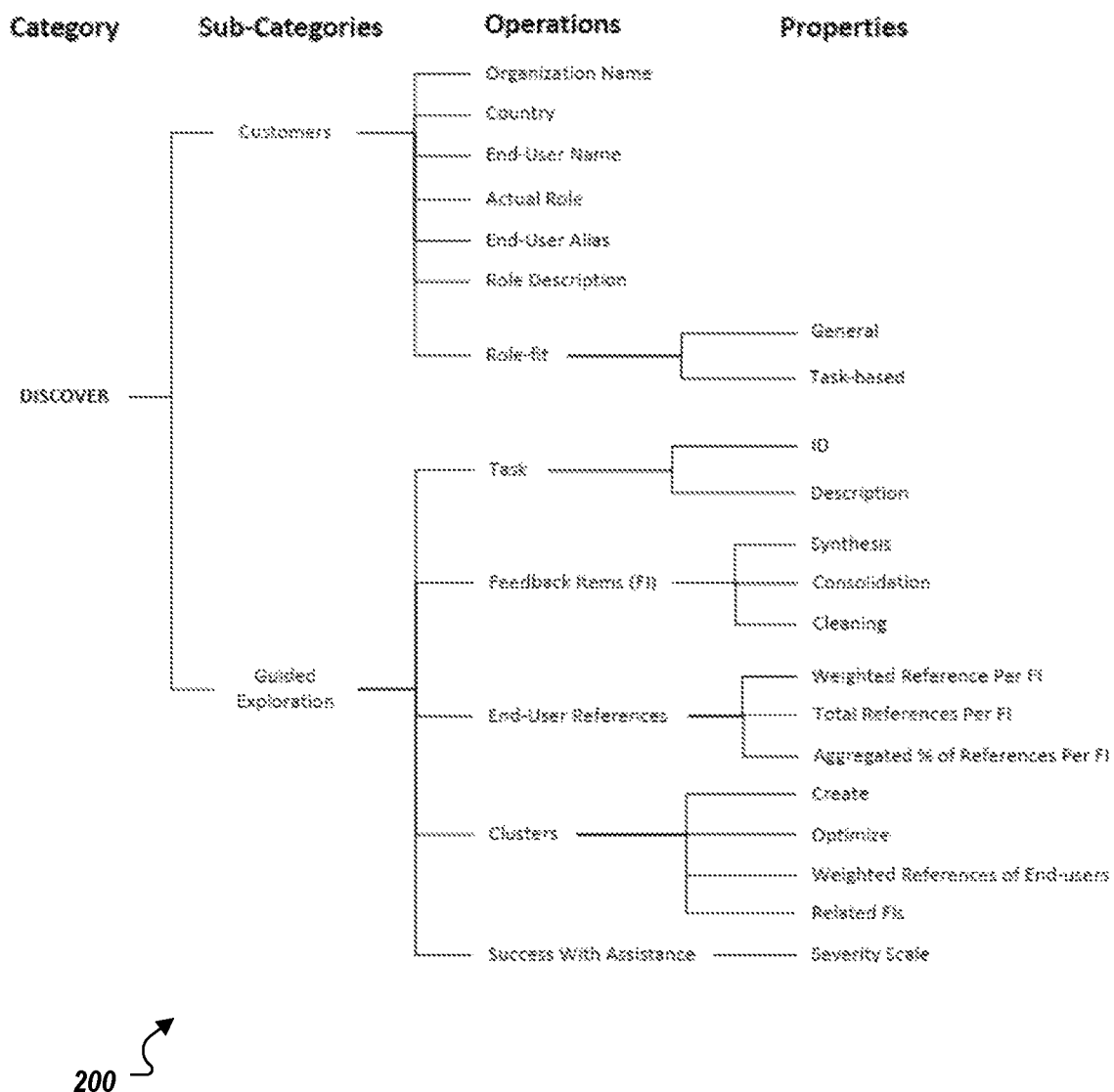
FIG. 2 shows an example schematic of the Discover category, sub-categories, operations, and properties, according to implementations of the present disclosure.

FIG. 2 shows an example schematic 200 of the Discover category, sub-categories, operations, and properties. The Discover category can include two sub-categories—Customers and Guided Exploration classifications. As used herein and in relation to FIG. 2, an end-user can refer to a testing user who is involved in the UX testing of the software. As previously described, particular end-users may be a software validation end-user whose interactions are with the software while testing and are used to make the software better, while other end-users may be commercial end-users whose interaction with the software are performed after testing is done and whose input to the software is designed to achieve the purpose for which the software was designed. An end-user represents a person that encapsulates the description and characteristics of a (e.g., business) role, or in more detail of a persona. A role might consist of more than one persona, depending on the viewpoints and specifics of a solution. For example, the role of Project Manager might include the personas, or an instance of a particular role, of project manager that are related to an application for project planning generation and allocation of resources, and an application that monitors the execution of the project plan as well as the collaboration with the consultants. Application herein refers to a goal-directed piece of software that does specific jobs (e.g., implements a number of use cases). Using the application, a user can undertake tasks and particular use cases by using the application, where the application regards a particular set of thematic topics, for example, planning. As used herein, a persona refers to a type, category, or classification of the end-users, based on their job title, tasks or duties involved in their job, responsibilities of their job, what types of end-users may report to them, and/or other criteria.

In general, a team can begin the analysis with the Discover phase, formulating a first understanding of the collected data, by capturing, consolidating, synthesizing, and iterating on the content of the raw seeds of information (e.g., interactions with the software). This phase consists of two subsequent process steps: Customers and Guided Exploration. In the Customers stage, the team records descriptive details about the end-users as well as the degree that they fit to the expected user profile and tasks. The role fit will be used throughout the analysis for weighting the responses of the end-users, assigning importance, and treating data with fairness. The Customers sub-category receives as input the profiles of the end-users containing details like organization name, country, end-user name, actual role, end-user alias and role description, and provides output related to end-users insights and the role-fit. The role-fit may be a general background check across the business scenario and tasks, or task-based measuring the degree of goodness of the role for a specific task. This allocation may pre-suppose the verification of the initial (e.g., expected) end-user profile, as prepared by the team before the end-users recruitment for the usability studies, with the profiles of each end-user collected during the execution of the session (e.g., actual). The team may then measure to what extent there is a match among the initial and actual end-user profiles where, generating a percentage, such as 75% fit in tasks 1-3 and 100% fit in tasks 4-6. When there is a clear understanding about the end-users that have participated in the study, then the team can move on to the qualitative analysis by utilizing the Guided Exploration subcategory.

During the Guided Exploration process step, the team applies various iterative operations on the raw data for identifying inconsistencies, gaps or misconceptions, and turning them into a coherent data set of feedback items. This activity will produce optimized clusters with the end-users' weighted reference assigned to each one of them, specific aggregation calculations and the success with assistance for each end-user (e.g., a degree of external influence for accomplishing a task). As noted, the Guided Exploration process can receive as input the raw data of the validation script notes collected during the usability study and, through various iterative operations, produce optimized and semantically enriched clusters containing feedback expressed with active wording for enhancing the clarity of a fact or event. The validation script may comprise a document prepared before the execution of the usability tests for the team, and can contain the scope and specifics of a test. This may include, in some instances, what needs to be validated based on priorities (e.g., specific questions, tasks descriptions, screen flows that the end-users will interact with, post questions, etc.). Note takers and others can have this document in front of them and take notes based on their observations and the end-users actions and performance during execution. These notes can, in some instances, be the content that includes the qualitative data that will be analyzed by the platform. Such operations can include task identification and description, and allocation of the respective feedback items to one or more tasks. In general, a task is a specific piece of job that a user does to accomplish a goal (e.g., it may satisfy the needs of a broader Activity which in turn satisfies the objectives of Business Process phase). So, yes, a s/w is used in order for a user to execute a task (e.g., create travel expenses). And it is evaluated among others for the effectiveness, efficiency, accuracy of completion, etc.

Allocation of feedback items can be performed after the synthesis, consolidation, and cleaning process of data. Feedback items are assigned to one or more tasks (e.g., tasks that have been prepared to test and exist in the validation script). For each task, feedback or feedback items are collected, where the feedback represents a generic term referring to the qualitative data collected from the usability tests. For example, at this stage, it may not be known if a comment or observation is a "painpoint," which is the type of the feedback item, and/or what is its nature—this can be performed at the Learn phase. The end-users weighted references can be assigned on each feedback item based on their fit in the respective tasks identified earlier, and specific aggregation calculations can be applied to obtain the total references per feedback item by the end-users. In some instances, clusters may include feedback items of the same nature, such as those that have the same goal, refer to the same observation, represent a repeated statement that is presented in slightly different manners, comments that may be related or provided together, as well as others.

Furthermore, the success with assistance for each end-user on a scale from 0-4 can be recorded, indicating the degree of external influence (e.g., tips or hints by the moderator of the usability test) that an end-user received while accomplishing a task. Success with assistance refers to the influence (e.g., hints, subsequent clarifications, deductive approaches to solve the task, etc.) that an end-user receives (usually from a moderator) for completing a task or interaction for accomplishing something asked for from the end-user, and that is tested. In some examples, success with assistance has a value from 0 (i.e., no assistance) to 4 (i.e., significant assistance). In other words, "0" may mean that the end-user needed no help to accomplish a task, while "4" means that the end-user needed significant help or clicked in every possible option before discovering the successful path for the solution of a task.

Figure 3:
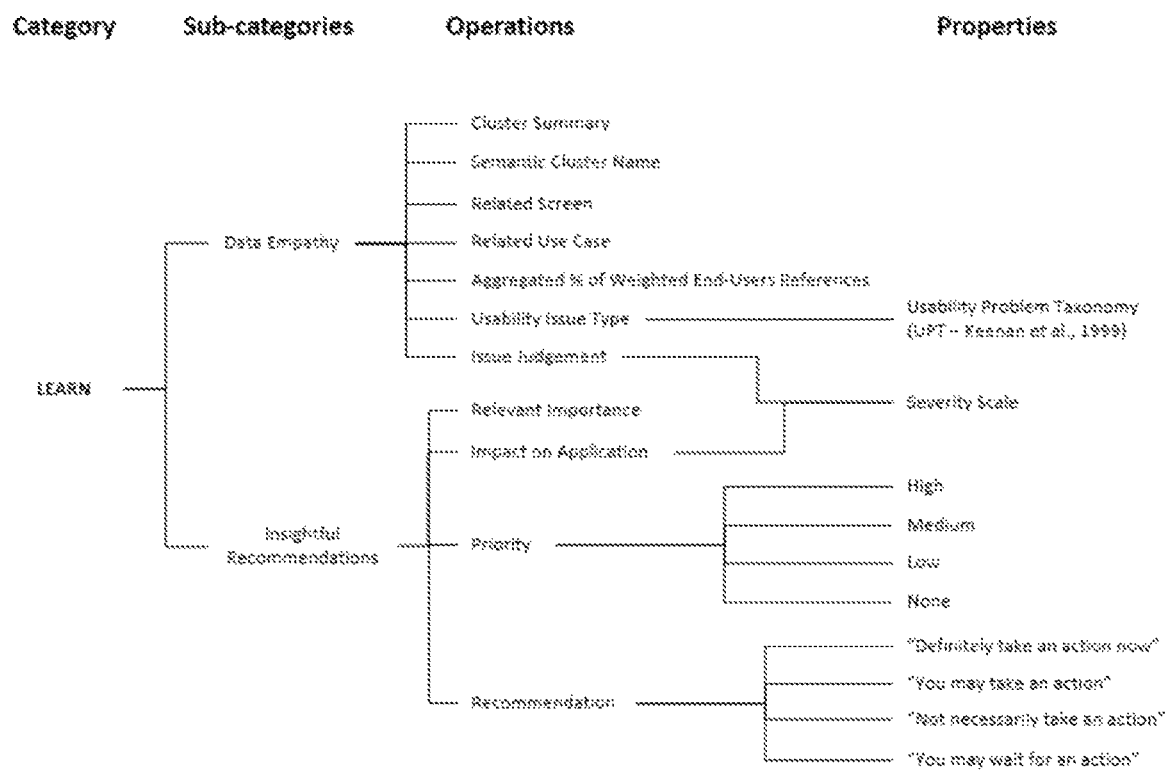
FIG. 3 shows an example schematic of the Learn category, sub-categories, operations, and properties, according to implementations of the present disclosure.

FIG. 3 shows an example schematic 300 of the Learn category, sub-categories, operations, and properties. The Learn category can include two sub-categories—Data Empathy and Insightful Recommendations classifications. Creating data empathy can be considered a key aspect of the taxonomy, given the importance of facilitating the objective observation and unbiased interpretation of the data, as well as the precise association of the various units of information in an attempt to reveal holistic and inclusive meanings of a feedback item (or cluster thereof). Data empathy facilitates objective observations and unbiased interpretations of the data by the team, as well as the precise association of the various units of information (e.g., artifacts like designs, use cases, etc.) in an attempt to reveal holistic and inclusive meanings of a feedback item (or cluster). In particular, data empathy concentrates on a specific task each time and interaction requirements that may be defined by the team prior to the usability study. For example, each task can be imported through the task identifier (ID) from the Guided Exploration classification to the remaining classifications, while maintaining a semantic link between them. It can employ operations such as cluster summary (e.g., to optimize the content and insights of each cluster as those are dictated by the subsequent feedback items that are composed (e.g., using more direct language, sentence description to avoid fuzziness, such as the button at the bottom of the screen was not visible, which may be a result of 3 feedback items that are more descriptive with feelings of the end-users and observations and formulate this cluster), semantic cluster name or type (e.g., the generation of a title conveying the essence of the clusters content to be used for quick reference and input to other classifications, for smart filtering, statistical analysis, and overview), association of a cluster with the related screen or design and use case defined before the usability test, an aggregated percentage of the weighted references made by the end-users, identification of the actual usability issue type (e.g., based on the Usability Problem Taxonomy), and/or judgment of the given usability issue as positive, neutral, or negative.

The Insightful Recommendations sub-category facilitates a deeper understanding of the data under investigation allowing the identification of: 1) the relevant importance for each cluster (e.g., to what extent a percentage of end-users' references for a feedback item are to be considered or not); 2) impact on the application (e.g., if a usability issue is severely influencing the functionality or perception of end-users for a specific product); and/or 3) priority, to determine if a usability issue has a high, medium, low, or no priority to be addressed (e.g., in the next development cycle). In addition, recommendations how the team can proceed (e.g., if it needs to take an immediate action regarding a usability issue or not) can be calculated using the relevant importance and the impact on application. Insightful Recommendations may be a parallel process step to Data Empathy where the tool provides suggestions (e.g., by considering the relevant importance and the impact on an application as defined in the data empathy process step) on how the team can proceed to the next stage (e.g., if an immediate action regarding a usability issue should be taken or not).

Figure 4:
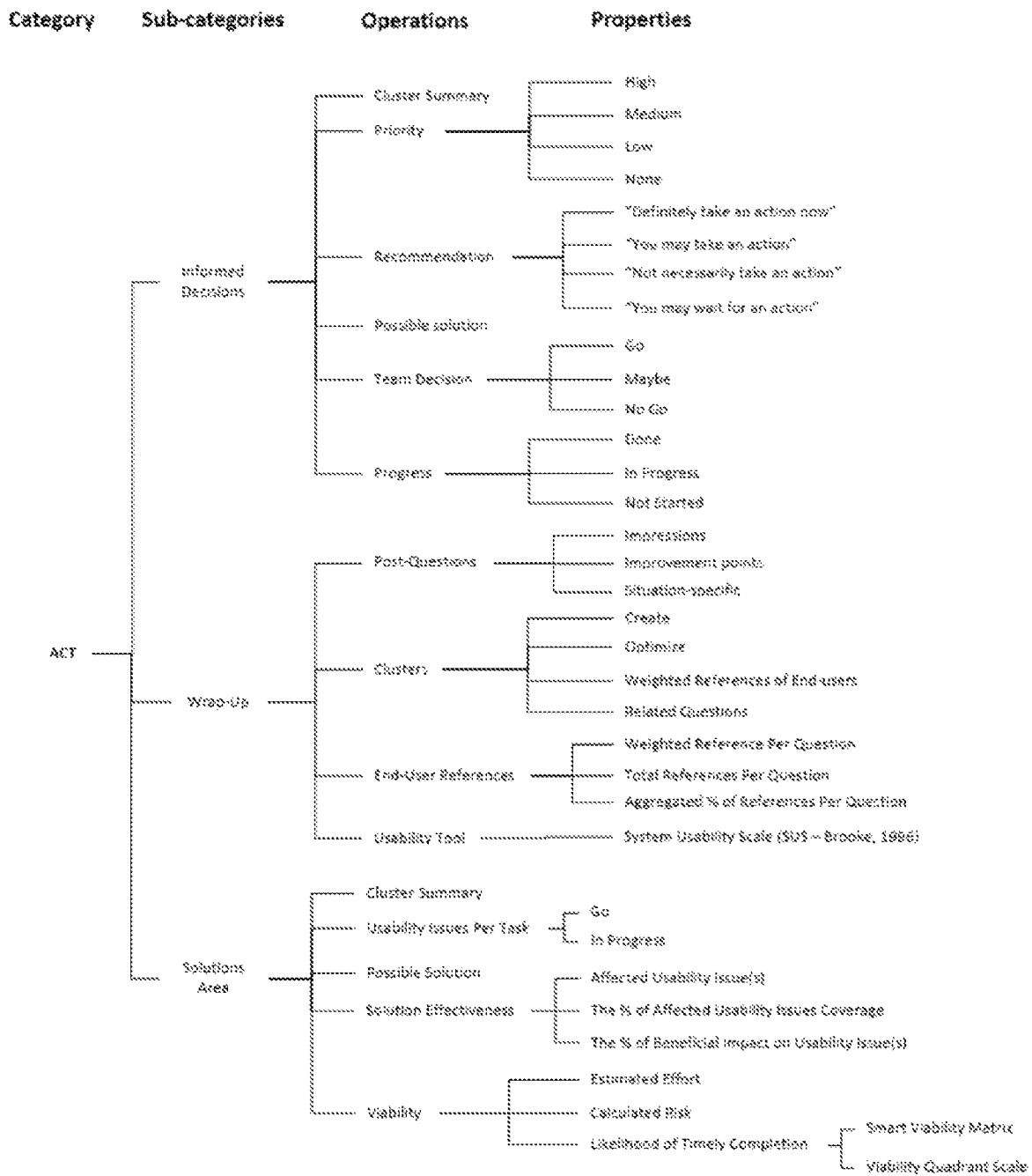
FIG. 4 shows an example schematic of the Act category, sub-categories, operations, and properties, according to implementations of the present disclosure.

FIG. 4 shows an example schematic 400 of the Act category, sub-categories, operations, and properties. The Act category can include three sub-categories—Informed Decisions, Wrap-Up, and Solutions Area. The Informed Decisions sub-category can receive the insightful recommendations generated from the Learn classification, and may yield possible high-level solutions and actions for the identified usability issues. Main operations that drive a team's decisions regarding the actions to be taken for each feedback item include the task ID, cluster summary, priority, and recommendation, as well as possible solutions (e.g., discussion points and alternative suggestions that could be applied for tackling one or more usability issues), team decision (e.g., with properties like 'go', 'maybe' or 'no go' for a solution), and progress identification (as 'done', 'in progress' or 'not started'). The Wrap-Up classification handles all the information and analysis that takes place usually after the usability study's main tasks execution and includes operations like the analysis of post-questions (e.g., impressions, improvement points, or situation-specific comments), clustering of these feedback items (e.g., including optimization, allocation of weighted references of end-users and association with the related questions), weighted end-users' references per question and aggregation, and usability or UX test tools' responses. Such responses can include data collected through the use of a usability tool or questionnaire, such as for cross-evaluation of the main tasks, such as System Usability Scale (SUS) or User Experience Questionnaire (UEQ). In one example, the output of FIG. 3 may be a cluster description reciting: "Changing the progress in an action might be an indicator for the Project Manager that a Consultant is working on it," along with a recommendation from the tool "You may wait for an action" (since it has Medium impact on the application and only 19% of references by the end-users). A solution then from the operations described in FIG. 4 may include an instruction or suggestion of "Investigate if it makes sense better to set the action in progress once an edit is done on the action."

The Solutions Area sub-category enables a deep dive to the alternative approaches for solving the discovered usability issues. The team has the chance to synergistically work towards detailing high priority usability issues that have been assigned with a 'go' and are 'in progress' (e.g., in the Informed Decisions classification) for identifying viable solutions. This sub-category can include operations such as task ID, cluster summary, usability issues per task (e.g., with properties 'go' and 'in progress'), possible solutions (e.g., a list of alternative approaches discussed by the team for solving the usability issues), solutions effectiveness (e.g., indicating which usability issues are influenced or solved by which solutions and to what extent they are solved), and also the coverage a solution has across the usability issues (e.g., solves four of them fully or partially with a beneficial impact of 45%, once its total contribution is calculated). Also, an operation is the viability which is realized through properties such as estimated effort (e.g., how much time is needed for a specific solution to be implemented based on existing resources, expertise, know-how, difficulty, etc.), calculated risk (e.g., issues that might arise during the process and might hinder or delay the expected implementation, such as a lack of existing guidelines or external collaborations), and likelihood of timely completion (e.g., a reconfigurable smart viability matrix that allocates a solution based on the assigned effort and risk to a viability quadrant scale indicating how probable it is to be successful).

Figure 5:
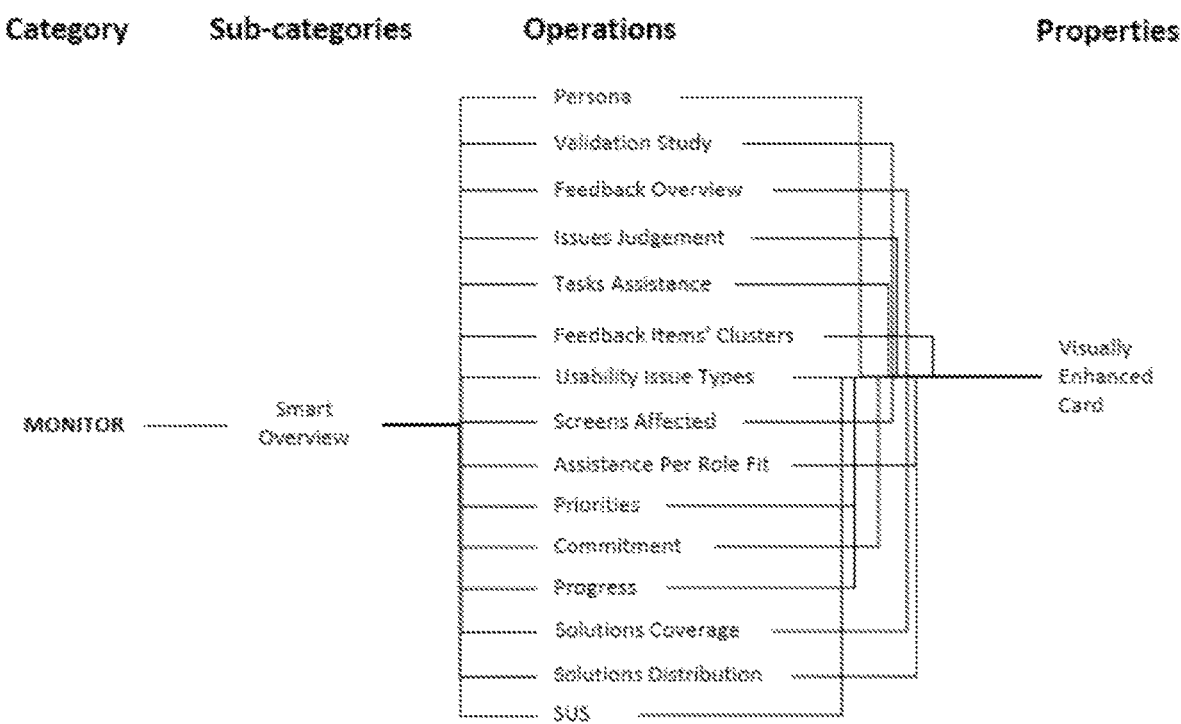
FIG. 5 shows an example schematic of the Monitor category, sub-category, operations, and properties, according to implementations of the present disclosure.

FIG. 5 shows an example schematic 500 of the Monitor category, sub-category, operations, and properties. The Monitor category can include the Smart Overview sub-category which facilitates the continuous monitoring and exploration of the information that has been extracted from the previous classifications. It can generate visually enhanced cards based on operations such as persona creation, validation study, feedback overview, issues judgment, tasks assistance, feedback items' clusters, usability issue types, and so forth. These operations can receive input from the previous classifications and despite the presentation of a quick overview of the empirical research outcome, can guide project teams to an informed drill-down on the reformulated semantic data (e.g., by applying filters) for prioritizing their actions and decisions. Furthermore, the presentation of the data facilitates the quick transition from data analysis to documentation and fast reporting (e.g., by cropping and pasting the visual cards in perspective). In general, the Smart Overview takes as input the outcome extracted from the data analysis and previous classifications (as shown in the prior figures) and generates visual cards with the results and statistics (e.g., identified tendencies, comparisons, etc.), to be used for reporting, further guided exploration, and others. For example, if a value is on "7" for a specific painpoint, a team can drill in to the data set by filtering on this painpoint and see its relationships, impact, reference from the users, how many tasks relates to, etc., for decision making.

Implementations provide an end-to-end methodological approach that adheres to the workflow-as-a-service paradigm, for applying guided exploratory analysis on empirical data gathered from usability studies (e.g., of educational, enterprise solutions). Unveiling hidden correlations and uncovering significant insights about empirical data involves a mix of techniques and approaches as well as an analytical perspective or approach. However, for individuals with limited technical background or analytical experience, this is often a very complex task, requiring the understanding of both the available methods and tools but also understanding the process of exploratory analysis (e.g., drilling down, creating associations, analyzing frequencies, recognizing patterns and trends, etc.). To address this challenge, implementations facilitate a structured yet flexible iterative process that consists of four interrelated phases: Discover, Learn, Act, and Monitor.

FIGS. 6-9 show example flow diagrams for the process that may be performed by the platform, using the taxonomy, according to implementations of the present disclosure. Operations of the process can be performed by the analysis module(s) 112, the UI(s) 120, the API(s) 122, and/or other software module(s) executing on the device(s) 110 or elsewhere. FIGS. 6-9 illustrate respective the Discover, Learn, Act, and Monitor phases of the process. The results of one phase may provide input for the next phase in the process.

Figure 6:
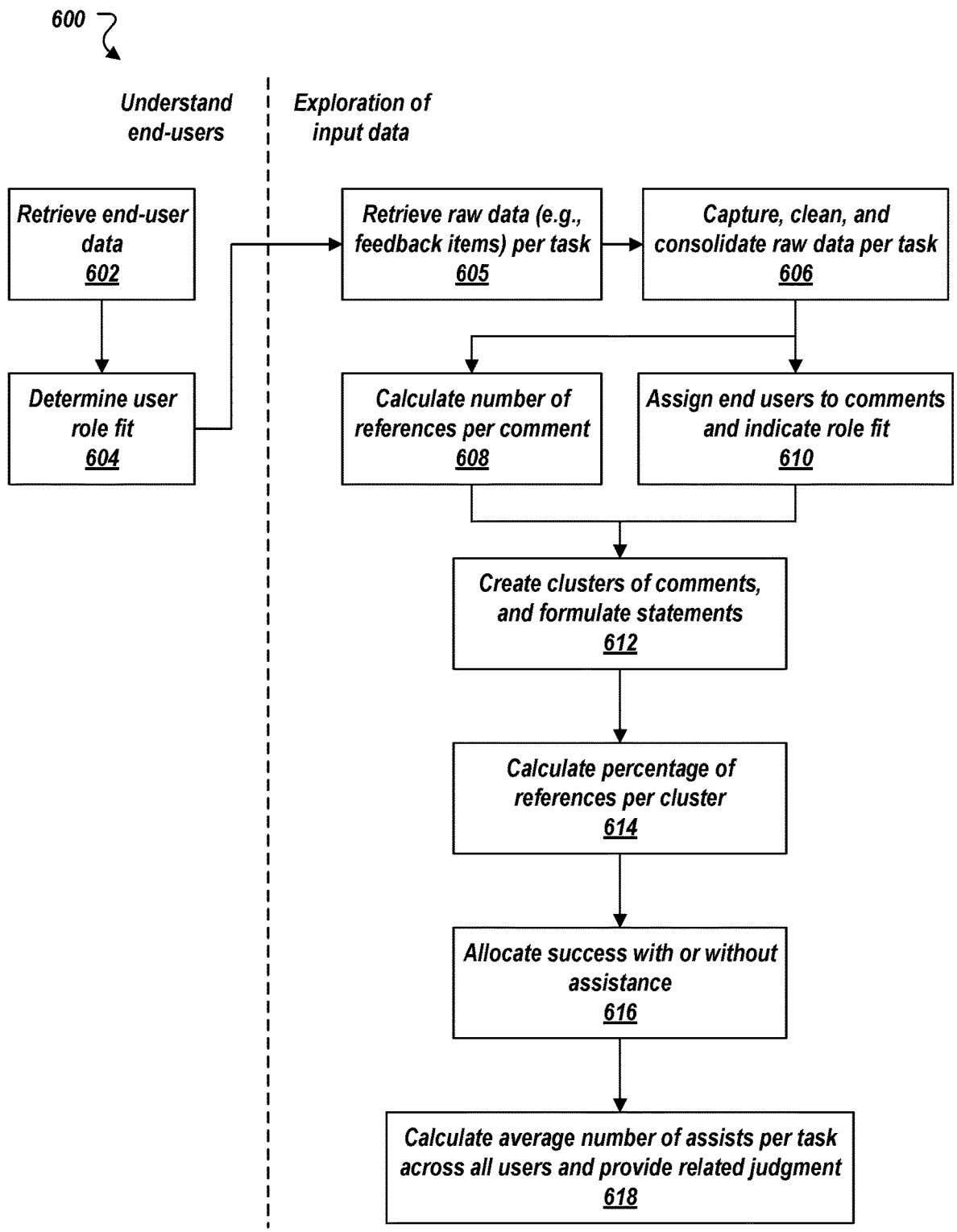
FIGS. 6-9 show example flow diagrams for the process that may be performed by the platform, using the taxonomy, according to implementations of the present disclosure.

FIG. 6 shows an example flow diagram 600 for a portion of the process that may be performed during the Discover phase. Initially in the Discover phase, end-user data is analyzed to develop an understanding of the end-users who are interacting with the software under test during the usability testing. End-user data is retrieved (602). This data can include, for each of one or more end-users, attributes such as an organization name, location (e.g., country), end-user ID, end-user role, description of responsibilities, and so forth. The raw data retrieval, in some instances, is a parallel process to end-user identification and descriptions. In some instances, the retrieval and information may be associated only with the task in hand. For the end-user data, the information retrieved may be a role-fit for a particular task. For example, although a result may have similar end-user roles by name, one user may have a 100% fit to task 1 and a 40% fit to take 2.

A determination is made (604), for each end-user, of the role fit for the end-user. This can include determining the extent to which a particular end-user fits or corresponds to a previously characterized persona (e.g., role or type of end-user). Implementations support the use of various techniques to determine role fit. For example, role fit may be determined by the development team. Alternatively, the process may compare characteristics of an end-user to various personas and determine a (e.g., statistical) similarity metric indicating how closely the end-user fits to one or more personas. Role fit determination can include comparing the characteristics (e.g., responsibilities) of an end-user to characteristics of a previously determined (e.g., team-defined) persona (e.g., a role, type, or archetype), and the role fit may be a metric that measures a degree (e.g., percentage fit) to which there is a match between the characteristics of an end-user and those of a previously determined persona. A particular project or instance of usability testing may employ end-users with a particular persona (e.g., role), or multiple groups of end-users with different roles.

The Discover phase can then proceed to a guided exploration of the qualitative input data. The raw data (e.g., feedback item(s) provided by end-user(s) can be retrieved (605). Operations can be performed (606) to clean and/or consolidate raw data per task. The raw data can refer to the feedback items received from end-users. This can provide an initial analysis and understanding of the raw data obtained from various end-users observations and notes during or after usability testing. The cleaning and structuring of the data may include any number of iterations, as the input data is received. For example, each iteration may process another batch of input data generated through usability testing sessions. During this step, the raw qualitative input data (e.g., user comments, notes, etc.) is processed. Examples of qualitative data include comments such as "I really like the remind functionality," or "I expected the follow-up directly on the Issue detail screen," among others. Quantitative information and raw data may include the success with assistance information (e.g., a value of 0-4 for each end-user for each task), the interaction path that followed for accomplishing a particular task, and other similar data. In one example, a vector 3-4-6-7-9-5-9 may be determined, where each number represent an identifier of an object that is visited or clicked, or a time value (e.g., 10, 7, 9, seconds) that the end-user remained in a particular screen or UI, among others.

A number of references per comment or feedback item can be calculated (608). A comment may include, among others, a single data point to a single task or a more general comment that spans several tasks within the software being tested. A feedback item (or comment, feeling, or observation, etc.) is a subset of a cluster. This indicates how many end-users made a similar comment(s) related to a particular task or set of tasks. In addition to calculating the number of references to a set of comments (or feedback items) that belong to a task or set of tasks made by the complete set of testing end users, each individual comment can be weighted based on the role fit metrics of the end-user providing the comment. For example, for an end-user with 60% role fit to the target role, their comment may count as 0.6 in the number of references calculation. End-users can be assigned to comments (that they referred to) based on their role fit to allow for a weighted reference (610). At this stage, the count of the references per comment is weighted according to the role fit of each end-user relative to a target role, producing a total relative number of references per comment. These operations 608 and 610 may be performed in parallel in some implementations. The role fit for each end-user is determined at 604.

Clusters of comments can be created (612) and statements can be formulated. The various comments can be analyzed to determine similarities between comments and to determine whether the comments are similar enough to be clustered together, based on their semantic meaning and/or common actions or action goals (e.g., as defined by the product team). An action goal might be, for example in this case, a development of a feature that solves two problems that might not be significantly semantically related. However, the product team might decide to tackle them together.

Action goals may be a different trigger or logic for formulating a cluster. These may be phrased as more specific and/or concrete statements to take actions on. Clusters of comments refer to the (e.g., semantically) same or similar topic, or can otherwise reflect a determination that a group of comments are to be addressed together through a same eventually determined action. The determination may occur during a Discover phase, where the feedback items are checked and an attempted understanding at how those items are semantically related and can be fit together, or alternatively based on common future actions. In one instance, a first suggestion would be made by sentiment analysis (e.g., using a natural language processor (NLP)), and a text analyzer/algorithm would propose a first grouping of the existing items. In some implementations, a summary description of each cluster may be formulated at this stage, which may be a singular name by which the group is referred in some instances. This summary description, also referred to as the statement or specific statement of the cluster, can provide a briefer and more concise description of the comments in the cluster, e.g., briefer than the comments themselves. For example, generating the summary description can include extracting the main message using active wording, turning comments into more manageable items that can be acted on, and so forth. Clusters of comments can also be described as feedback (FB) items, and referred to by their specific statements or summaries.

A percentage of references per cluster can be calculated (614), e.g., relative to the role fit. In some implementations, the process can determine the number of users that referred to the same feedback items in a cluster, and based on their role fit the process calculates a weighted average value of reference for this cluster. For example, if a cluster includes four comments, with seven references to those comments made by end-users, the percentage of references may be determined as the average number of references weighted according to role fit for each of the end-users associated with the comments.

A determination (e.g., allocation) can be made whether the end-users were able to accomplish a task (e.g., achieve the goal of the task) with or without assistance (616) of a moderator or other personnel on site during the usability testing. In some implementations, the determination of assistance received by an end-user may be as a metric that is in a range from 0 (e.g., no assistance was needed) to 4 (e.g., much or maximal assistance was needed), and this information may be captured during the usability testing sessions.

An average number of assists per task can be calculated (618) across all end-users, and related judgments can be provided. Related judgments may include an outcome of a calculation that considers the success with assistance. For example, if the success with assistance rating is a "4," or an average over a period of attempts is greater than "3," then an algorithm may provide a message saying that the task failed. Based on the average amount of assistance per task, a judgment may be determined as one of the following, for example, Success, Fair, Much, Too Much, or Fail.

Figure 7:
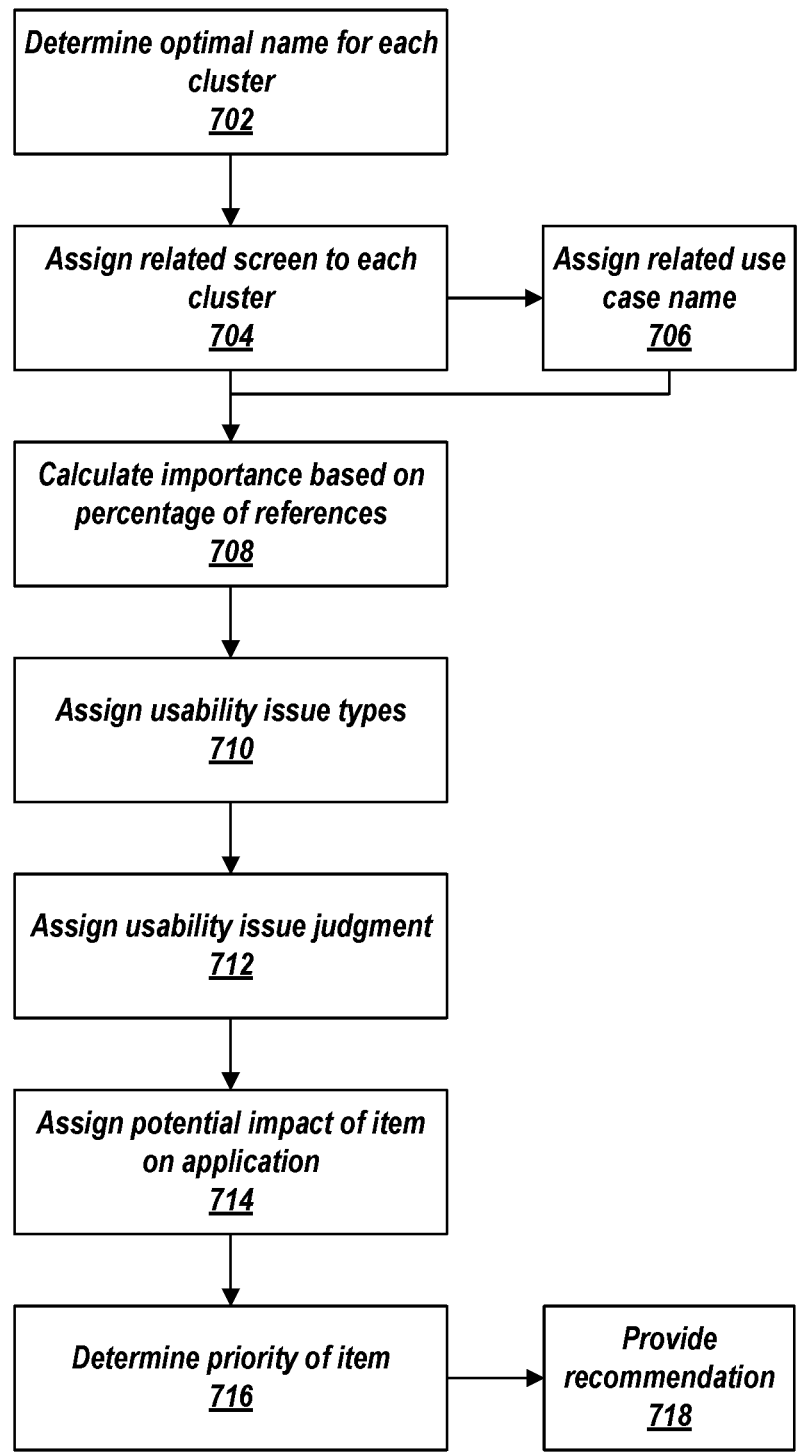

FIG. 7 shows an example flow diagram 700 for a portion of the process that may be performed during the Learn phase. During this phase, insightful recommendations may be generated and provided, by providing meaning to the data in a manner that does not bias the data toward any particular outcome of a recommended action.

An optimal name can be determined (702) for each cluster. In this step, lexical analysis can be applied to determine an optimal name to be applied to the cluster to characterize the cluster. Such a name can facilitate guided exploration, as described previously in example FIG. 2. The name may be determined through an algorithm that involves semantic analysis or other techniques. For example, a cluster of comments related to problems locating a particular list of personnel in the UI under test may be assigned the name "personnel list." In this way, the name can be a topic of the cluster comments. Cluster types may or may not be unique among the clusters. Cluster types can be captured, meaning for example that 5 clusters might be of the same type or theme, but represent different content or messages. In this analysis, a type of the cluster as expressed through a single, two, or other short phrase of words is determined. In contrast, FIG. 5 describes optimizing comments. As an example here, consider received raw FB items as follows:

(1) "He could not find the priority immediately. Maybe he was influenced from the fact that in the header there is not indication other than high priority."

(2) "I only pushed two buttons to figure out (change prio), so this is good. It is good that you only have 3 buttons."

Using this example, an optimized description may be defined as in FIG. 2, reciting that "Priority is not visible if it is not high. It is really good to change priority with a couple of clicks."

In contrast, the operations of 702 can generate a cluster name or type, such as "Priority." This name will be used, for example, in FIG. 5 to create statistics and visual cards. For example, on a graph users may see that there are 7 types of clusters with "priority." There can then be an overview or drill-in based on this, and the users can see which comments relate to "priority" and all the other semantic information created earlier.

A related screen that was displayed to the testing end-user that coincides with the comments can be assigned (704) to each cluster, indicating which screen(s) of the UI of the software under test were being tested when the comments in the cluster were generated.

In some implementations, a related use case name can also be assigned (706) to each cluster. The related use case name can indicate which use case was active when the comments in the cluster were generated. Use cases can be created prior to usability testing, and a use case can provide a script or set of instructions that guides end-users through a particular task or set of interaction tasks (e.g., between the end-user and the UI/system under investigation) during the usability testing.

A relevant degree of importance can be calculated (708) for each cluster, based on the percentage of references for each cluster. As described in 614, the number of references for a cluster may be the (e.g., weighted) number of users who have made reference to a particular feedback item in their comments and, more particularly, based on the proportion (e.g., percentage) of the total number of end-users who reported that particular feedback item in their comments. At this stage, the process determines a degree of importance of this feedback item, based on the percentage of end-users who referred to a feedback item. In some implementations, the degree of importance can vary from 1 (e.g., least important) to 5 (e.g., most important), and can be assigned according to the corresponding range of the number of references. For example, a degree of importance of 1 can be assigned if the percentage references is less than 15%, and a degree of importance of 5 can be assigned if the percentage references is greater than 75%. The thresholds may be adjustable based on various considerations, and can be used to set priorities for the generation action items. This determination of degree of importance can also be described as a frequency at which the issue occurs leading to the feedback item.

Usability issue types can be assigned (710) to each cluster. Based on a list of the most common usability issue types, such as Affordance, Visual Design, Consistency, Navigation, Terminology, and so forth, implementations can characterize the findings. This can help to create a semantic understanding of the feedback items in relation to the visual and interaction controls used in the UI being tested. In some instances, the assigning of usability issue types can be performed manually by the team. There may be predetermined list of usability issues (e.g., based on a published taxonomy), and the team can decide or assign what each feedback item is as it related to a usability issue, such as visual, data entry, interaction, etc.

Usability issue judgments can be assigned (712) to each cluster. This can include identifying the nature of the feedback item based on a judgment, e.g., such as Positive, Neutral, or Negative. A usability judgment can be assigned for each usability issue of the cluster. For example, a cluster with a usability issue of Consistency may have an associated usability issue judgment of Negative, of the comments in the cluster tend to indicate a lack of consistency in the design of the UI element being evaluated.

The potential impact of a feedback item (or cluster) on an application can be assigned (714). For example, what impact would the issue have on the software under test if the issue goes unaddressed (e.g., unfixed)? This determination can be based on various considerations, and can have values of High, Medium, Low, or None. Example considerations and factors may be empirical, functional, developmental, and/or other factors. The particular potential impact may be a case-by-case determination, and may rely on the expertise of the underlying team and/or the result of a qualitative reflection or analysis.

A priority of a feedback item (or cluster) can be determined (716). In some instances, the priority of an item is calculated based on the feedback item impact and its relative importance as determined at 708. An example formula used to calculate the priority may be as follows: A value from 0 . . . 1 associated with the priority may be assigned to the relevant importance factor depending on whether it is a low to high impact. An example formula used in an Excel or other spreadsheet may include the following "=IF (M19="High";J19*1; IF(M19="Medium"; J19*0,66; IF(M19="Low";J19*0,33; IF(M19="None"J19*0,21;"Select Impact"))))"

At this stage, each cluster may have been assigned a set of attributes (e.g., a vector of information) including: optimal name, related screen(s), related use case(s), degree of importance, usability issue type(s), usability issue judgment(s), potential impact, and priority. The determination of each of these attributes for a cluster, as well as the recommendation (see below), may be through operation(s) of the automated process that applies semantic and/or NL analysis to the information in the cluster to determine the attribute(s). In at least some cases, determination of one or more of the attributes may be through assignment by an operator or set of operators collaborating together to determine the attribute(s).

A recommendation can be provided (718) based on the attributes of a cluster, such as a recommendation to take an action to address the feedback item of the cluster. The recommendation can be based on the priority calculation. For example a recommendation can be "Definitely take an action now," "You may take an action," "Not necessary to take an action," "You may wait for an action," "Definitely you can wait for an action," and so forth. Accordingly, a recommendation can include an indication of whether or not an action ought to be taken, as well as an indication of a degree of urgency (or lack thereof) with which the action ought to be taken. The recommendation can be a mapping of a combination of the priority of the feedback item and the potential impact of the feedback item.

An example recommendation calculation can be described here. This example considers the priority value (e.g., the value extracted by calculating the impact with the relevant importance above). Therefore, depending the value of the priority that a feedback item has in the scale of 1 . . . 5, for example, a respective message is displayed, as follows: "=IF(AND(N42<=5;N42>4);"Definitely take an action now"; IF(AND(N42<=4;N42>3);"You may take an action"; IF(AND(N42<=3;N42>2);"Not necessarily take an action"; IF(AND(N42<=2;N42>1);"You may wait for an action"; IF(AND(N42<=1;N42>0);"Definitely you can wait for an action";"No assigned priority"))))). In other words, an action is recommended to the team considering how many end-users referred to a feedback item (e.g., a usability issue) and what impact has on the system. The higher the priority (e.g., a value of 5), would mean that the corresponding message will be "take action now." It should be noted that the algorithms in the described platform may be customizable, so that a team can set its own rules and margins in their specific implementation, and as it believes can increase the validity for an outcome according to its specific situation.

Figure 8:
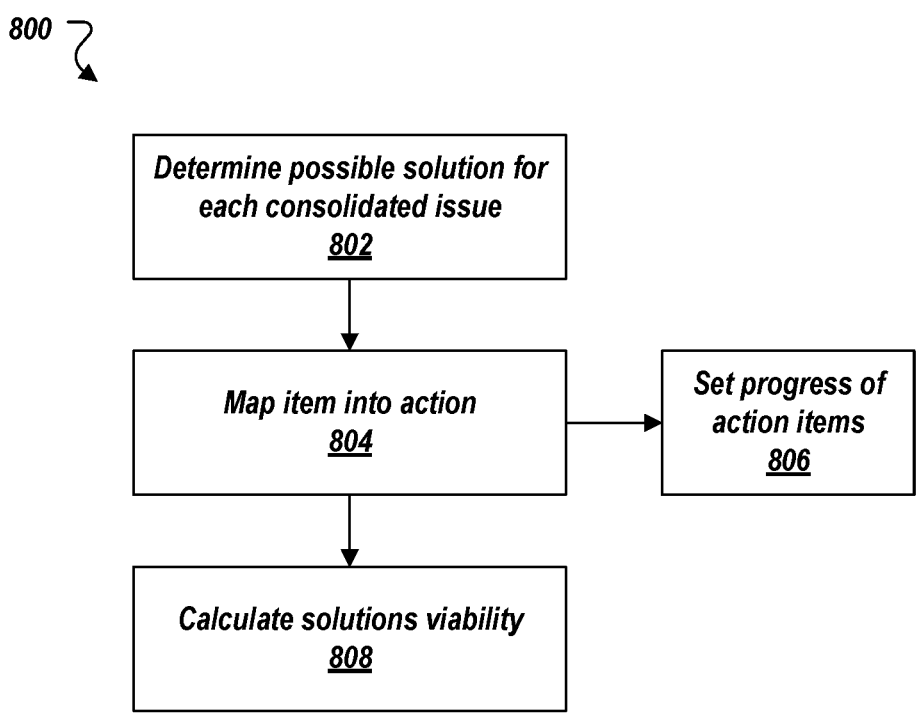

FIG. 8 shows an example flow diagram 800 for a portion of the process that may be performed during the Act phase. In this phase, an informed decision may be reached regarding actions to be taken. This phase may receive as input the recommendation(s) generated through execution of the Learn phase (e.g., 718). In some implementations, the generated recommendation(s) may be implemented by performing the recommended action(s), and the Act phase may be at least partly omitted from the process.

Possible solution(s) may be determined (802) for each consolidated issue (e.g., feedback item). At this stage, possible solutions to an issue may be analyzed in view of the recommendation generated during the Learn phase, as well as the other outputs of the Learn phase. Priorities, development backlog items for the next delivery cycle, and/or other information may also be taken into account when identifying possible solutions. The possible solutions may differ based on how a team wants to tackle a particular feedback item. The solutions are not fixed, and may be situation-specific and based on the usability issue, the problem, and/or the feedback item. In some instances, the solutions may be an implementation of a missing function, a re-design of a component (e.g., a button), or a change of the interaction elements on the user interface to reach a task, among other examples.

A feedback item may be mapped (804) to an action that can be taken. This can include the development of an initial understanding and making a preliminary decision for the applicability of a potential solution, based on which feedback item should be addressed through one or more actions. For example, a status of an action can be set to "Go," "No Go," or "Maybe." Items may be mapped depending on the priorities for the next delivery quarter, backlog priorities, issue severity, required time, among others. The team may decide to continue with an action for a feedback item now or wait for a later stage.

The progress of action item(s) can be set (806). The progress of an action that has been labeled with status "Go" can be updated with a particular progress indication, such as "Not Started," "In Progress," or "Done." Progress can be determined from a product team associated with the solution, and may be a qualitative factor indicating the status accordingly, such as an action/solution/development is started or in progress, is in a planning stage or has not been started, or has been concluded or otherwise completed.

A viability of the solution(s) may be calculated (808). At this stage, a further analysis of the potential solutions can be performed by calculating the likelihood of each solution's timely completion (e.g., prior to a deadline such as a release date). This can include assigning values for effort and risk, and/or taking into account the extent of impact and coverage of particular usability issues. In some implementations, calculation of viability of a solution may be through the application of a dynamic matrix of two dimensions measuring risk and effort of a solution.

In some implementations, suitable machine learning (ML) or artificial intelligence (AI) algorithms or engines may be employed to perform one or more of the operations in this phase. For example, a model may be trained using, as training data, actions that have been performed in the past to address UX issues and the outcome of such past actions (e.g., whether the actions reduced or eliminated comments regarding the issue). The model may then be applied to current usability testing results to determine the most appropriate action(s) to be taken. The model may be retrained or otherwise refined using the results of the latest action(s), and so forth across any number of iterations.

Figure 9:
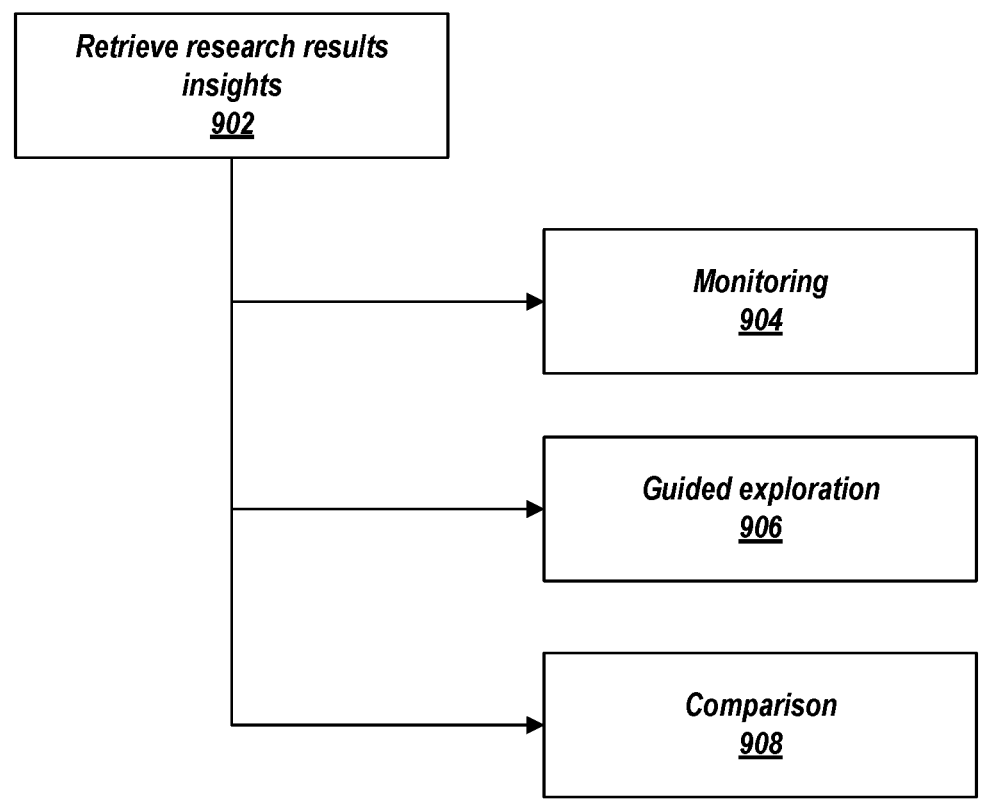

FIG. 9 shows an example flow diagram 900 for a portion of the process that may be performed during the Monitor phase. In this phase, an overview of the analysis can be generated and presented for review through the UI(s) of the platform.

Research results insights can be retrieved (902). Insights refer, generally, to the results of all the calculations and algorithms that take place during each phase and fused to the Smart Overview and visual cards for monitoring and further guided exploration in the data set (e.g., the system can drill in having a specific value/result (e.g., usability issues that were of type "consistency") and see that are 8 in total; to review and see its correlations, such as which task they belong, screen, use case, etc.). Therefore, insights might include statistical outcomes/graphs/data visualizations/ tables for comparison, trends, and frequencies, among others. The insights into the research results can be presented through a UI (e.g., dashboard) with multiple smart cards that present the collected data, outcome of prior calculations and decisions. The information presented in the cards may be dynamically connected to the analysis module(s) and updated in real time as further information is received and generated. Accordingly, the information presented may be up-to-date with the most recent input data generated through usability testing.

The dashboard can include functionality to present information for monitoring (904), guided exploration (906), comparison (908), and cross-validation (909). Monitoring can include information regarding progress and commitment. Guided exploration can include information regarding comment clusters and issues judgments. Comparison can include information regarding the severity of various usability issues across tasks, or total issues that the various screens have, or which tasks needed more assistance—or success with assistance across the role fit of the end-users, etc., and cross-validation can include information regarding third-party standardized tools score and outcome that measure user experience (e.g., User Experience Questionnaire (UEQ)) and usability (e.g., System Usability Scale (SUS)) for cross analyzing. For example, for one end-user, a set of comments and success with assistance for a topic or task can be presented, and can be cross validated with the SUS score. In other words, what the user said versus how the user interacted and the overall impression about the usability of the product (e.g., in terms of specific factors, like memorability, ease of use, etc.) can be presented.

Figure 10:
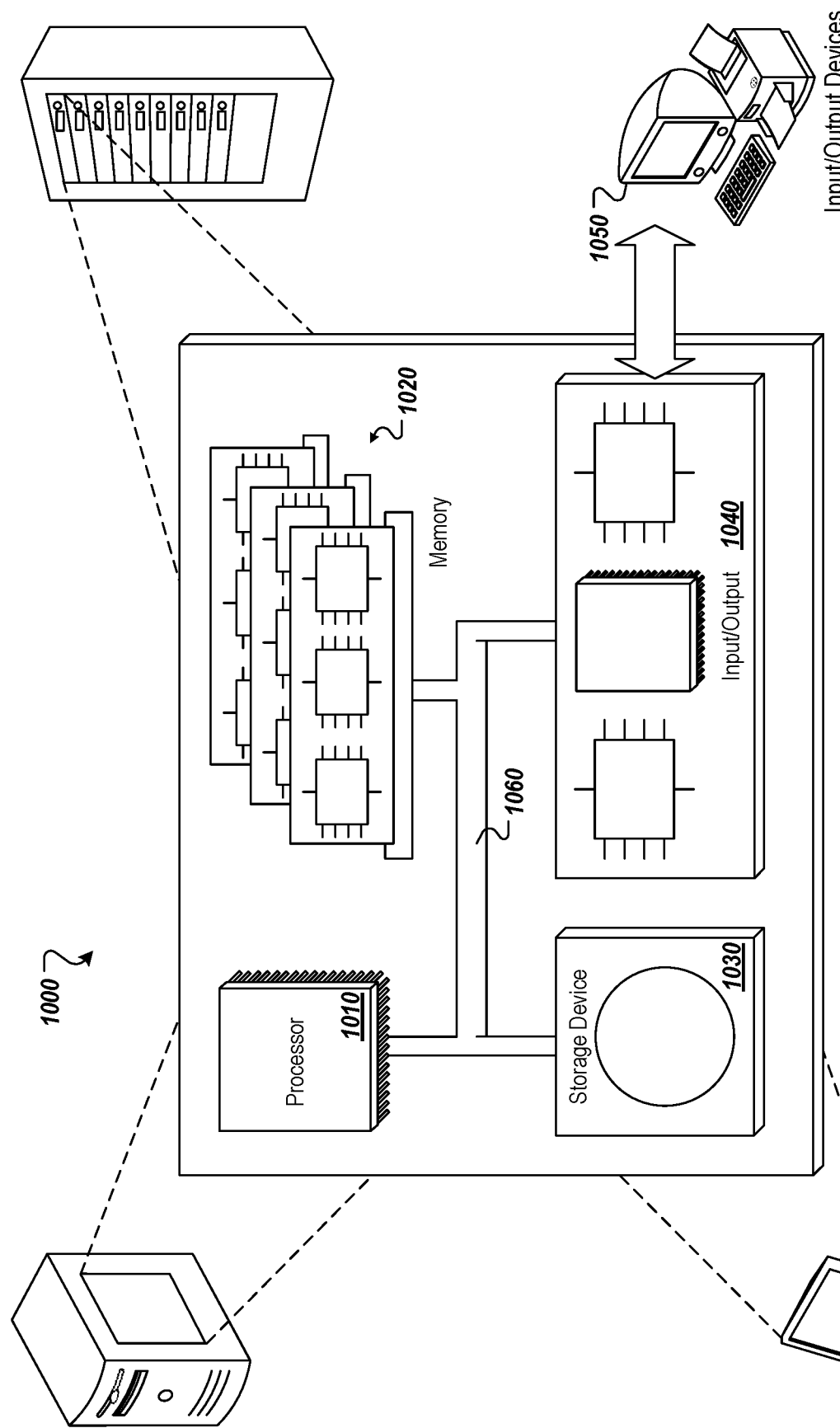
FIG. 10 shows a schematic of an example computing system, according to implementations of the present disclosure.

FIG. 10 depicts an example computing system 1000, according to implementations of the present disclosure. The system 1000 may be used for any of the operations described with respect to the various implementations discussed in this disclosure. For example, the system 1000 may be included, at least in part, in one or more of the device(s) 102, the device(s) 110, the device(s) 124, the system(s) 126, and other computing device(s) or system(s) described in this disclosure. The system 1000 may include one or more processors 1010, a memory 1020, one or more storage devices 1030, and one or more input/output (I/O) devices 1050 controllable via one or more I/O interfaces 1040. The various components 1010, 1020, 1030, 1040, or 1050 may be interconnected via at least one system bus 1060. The bus 1060 may enable the transfer of data between the various modules and components of the system 1000.

The processor(s) 1010 may be configured to process instructions for execution within the system 1000. The processor(s) 1010 may include single-threaded processor(s), multi-threaded processor(s), or both. The processor(s) 1010 may be configured to process instructions stored in the memory 1020 or on the storage device(s) 1030. For example, the processor(s) 1010 execute instructions for the various software module(s) described in this disclosure. The processor(s) 1010 may include hardware-based processor(s) each including one or more cores. The processor(s) 1010 may include general purpose processor(s), special purpose processor(s), or both.

The memory 1020 may store information within the system 1000. In some implementations, the memory 1020 includes one or more computer-readable media. The memory 1020 may include any number of volatile memory units, any number of non-volatile memory units, or both volatile and non-volatile memory units. The memory 1020 may include read-only memory (ROM), random access memory (RAM), or both. In some examples, the memory 1020 is employed as active or physical memory by one or more executing software modules.

The storage device(s) 1030 may be configured to provide (for example, persistent) mass storage for the system 1000. In some implementations, the storage device(s) 1030 include one or more computer-readable media. For example, the storage device(s) 1030 include one or more of a floppy disk device, a hard disk device, an optical disk device, and a tape device. The storage device(s) 1030 may include ROM, RAM, or both. The storage device(s) 1030 may include one or more of an internal hard drive, an external hard drive, or a removable drive.

One or both of the memory 1020 or the storage device(s) 1030 may include one or more computer-readable storage media (CRSM). The CRSM may include one or more of an electronic storage medium, a magnetic storage medium, an optical storage medium, a magneto-optical storage medium, a quantum storage medium, and a mechanical computer storage medium. The CRSM may provide storage of computer-readable instructions describing data structures, processes, applications, programs, other modules, or other data for the operation of the system 1000. In some implementations, the CRSM provides storage of computer-readable instructions or other information in a non-transitory format. The CRSM may be incorporated into the system 1000 or may be external with respect to the system 1000. The CRSM may include ROM, RAM, or both. One or more CRSM for tangibly embodying computer program instructions and data may include any type of non-volatile memory, including but not limited to semiconductor memory devices, such as EPROM, EEPROM, and flash memory devices; magnetic disks, such as internal hard disks and removable disks; magneto-optical disks; and CD-ROM and DVD-ROM disks. In some examples, the processor(s) 1010 and the memory 1020 are supplemented by, or incorporated into, one or more application-specific integrated circuits (ASICs).

The system 1000 may include one or more I/O devices 1050. The I/O device(s) 1050 may include one or more input devices, such as a keyboard, a mouse, a pen, a game controller, a touch input device, an audio input device (for example, a microphone), a gestural input device, a haptic input device, or an image or video capture device (for example, a camera). In some examples, the I/O device(s) 1050 include one or more output devices, such as a display, LED(s), an audio output device (for example, a speaker), a printer, or a haptic output device. The I/O device(s) 1050 may be physically incorporated in one or more computing devices of the system 1000, or may be external with respect to one or more computing devices of the system 1000.

The system 1000 may include one or more I/O interfaces 1040 to enable components or modules of the system 1000 to control, interface with, or otherwise communicate with the I/O device(s) 1050. The I/O interface(s) 1040 may enable information to be transferred in or out of the system 1000, or between components of the system 1000, through serial communication, parallel communication, or other types of communication. For example, the I/O interface(s) 1040 comply with a version of the RS-232 standard for serial ports, or with a version of the Institute of Electrical and Electronics Engineers (IEEE) 1284 standard for parallel ports. As another example, the I/O interface(s) 1040 are configured to provide a connection over Universal Serial Bus (USB) or Ethernet. In some examples, the I/O interface(s) 1040 are configured to provide a serial connection that is compliant with a version of the IEEE 1394 standard.

The I/O interface(s) 1040 may also include one or more network interfaces that enable communications between computing devices in the system 1000, or between the system 1000 and other network-connected computing systems. The network interface(s) may include one or more network interface controllers (NICs) or other types of transceiver devices configured to send and receive communications over one or more communication networks using any network protocol.

Computing devices of the system 1000 may communicate with one another, or with other computing devices, using one or more communication networks. Such communication networks may include public networks (for example, the Internet), private networks (for example, an institutional or personal intranet), or any combination of private and public networks. The communication networks may include any type of wired or wireless network, including but not limited to local area networks (LANs), wide area networks (WANs), wireless WANs (WWANs), wireless LANs (WLANs), and mobile communications networks (for example, 3G, 4G, Edge). In some implementations, the communications between computing devices are encrypted or otherwise secured. For example, communications employ one or more public or private cryptographic keys, ciphers, digital certificates, or other credentials supported by a security protocol, such as any version of the Secure Sockets Layer (SSL) or the Transport Layer Security (TLS) protocol.

The system 1000 may include any number of computing devices of any type. The computing device(s) may include but are not limited to a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (for example, a cloud computing device), a microcomputer, a system on a chip (SoC), and a system in a package (SiP). Although some examples in this disclosure describe computing device(s) as physical device(s), implementations are not so limited. In some examples, a computing device includes one or more of a virtual computing environment, a hypervisor, an emulation, or a virtual machine executing on one or more physical computing devices. In some examples, two or more computing devices are organized as a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, in other words, one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, for example, code that constitutes processor firmware, a protocol stack, a database management system, an operating system, or a combination of one or more of them. A propagated signal is an artificially generated signal, for example, a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, for example, magnetic, magneto optical disks, or optical disks. However, a computer need not have such devices. Moreover, a computer may be embedded in another device, for example, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, for example, a CRT (cathode ray tube) or LCD (liquid crystal display) monitor, for displaying information to the user and a keyboard and a pointing device, for example, a mouse or a trackball, by which the user may provide input to the computer. Other kinds of devices may be used to provide for interaction with a user as well; for example, feedback provided to the user may be any appropriate form of sensory feedback, for example, visual feedback, auditory feedback, or tactile feedback; and input from the user may be received in any appropriate form, including acoustic, speech, or tactile input.

Implementations may be realized in a computing system that includes a back end component, for example, as a data server, or that includes a middleware component, for example, an application server, or that includes a front end component, for example, a client computer having a graphical user interface or a web browser through which a user may interact with an implementation, or any appropriate combination of one or more such back end, middleware, or front end components. The components of the system may be interconnected by any appropriate form or medium of digital data communication, for example, a communication network. Examples of communication networks include a local area network ("LAN") and a wide area network ("WAN"), for example, the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described in this disclosure as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described in this disclosure should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown in this disclosure may be used, with steps re-ordered, added, or removed. Accordingly, other implementations are within the scope of the following claim.

The invention claimed is:

1. A system comprising:
   at least one processor; and
   a memory communicatively coupled to the at least one processor, and storing instructions which, when executed by the at least one processor, cause the at least one processor to perform operations comprising:
   receiving input data generated through usability testing of software, the input data including comments created by end-users interacting with the software;
   generating one or more clusters of the comments, each cluster including a subset of the comments that are semantically similar;
   determining a role fit metric for each of the end-users comprising:
      comparing characteristics of a respective end-user to characteristics of a previously determined persona, wherein the role fit metric for the respective end-user indicates a percentage degree of similarity between the characteristics of the respective end-user and the characteristics of the previously determined persona, and wherein the characteristics comprise one or more of an end-user role, a role description of responsibilities, a role-fit for a particular task, or a set of skills;
   calculating, for each of the one or more clusters, an importance metric for a respective cluster, wherein the importance metric is based on a proportion of the end-users that generated references to the comments in the respective cluster, and wherein the proportion is determined based on weighting the references of each of the end-users according to a percentage of the role fit metric of the respective end-user;
   generating, for each of the one or more clusters, one or more recommendations to address an issue described in the comments included in the respective cluster, wherein the one or more recommendations are generated based at least partly on the importance metric for the respective cluster; and
   providing the one or more recommendations through an interface.

2. The system of claim 1, the operations further comprising:
   determining a priority of addressing the issue associated with the respective cluster, the priority determined based on the importance metric of the respective cluster,
   wherein the one or more recommendations are based at least partly on the priority.

3. The system of claim 1, the operations further comprising:
   determining an impact, to the software of the issue associated with the respective cluster,
   wherein the one or more recommendations are based at least partly on the impact.

4. The system of claim 3, wherein the impact is determined through at least one machine learning algorithm.

5. The system of claim 1, wherein providing the one or more recommendations through the interface includes presenting the one or more recommendations through a user interface.

6. The system of claim 1, wherein providing the one or more recommendations through the interface includes providing the one or more recommendations through at least one application programming interface (API) that is accessed by one or more services.

7. The system of claim 1, the operations further comprising:
   generating a name for each of the one or more clusters by applying natural language processing to the comments in the respective cluster.

8. The system of claim 1, the operations further comprising:
   determining a usability issue type for each of the one or more clusters by applying natural language processing to the comments in the respective cluster.

9. The system of claim 8, the operations further comprising:
   determining a usability issue judgment for each usability issue type by applying the natural language processing to the comments in the respective cluster.

10. The system of claim 1, the operations further comprising:
    determining, for the respective cluster, one or more of an associated screen and an associated use case.

11. A computer-implemented method performed by at least one processor, the method comprising:
    receiving input data generated through usability testing of software, the input data including comments created by end-users interacting with the software;
    generating one or more clusters of the comments, each cluster including a subset of the comments that are semantically similar;

determining a role fit metric for each of the end-users comprising:
  comparing characteristics of a respective end-user to characteristics of a previously determined persona, wherein the role fit metric for the respective end-user indicates a percentage degree of similarity between the characteristics of the respective end-user and the characteristics of the previously determined persona, and wherein the characteristics comprise one or more of an end-user role, a role description of responsibilities, a role-lit for a particular task, or a set of skills;
calculating, for each of the one or more clusters, an importance metric for a respective cluster, wherein the importance metric is based on a proportion of the end-users that generated references to the comments in the respective cluster, and wherein the proportion is determined based on weighting the references of each of the end-users according to a percentage of the role fit metric of the respective end-user;
generating, for each of the one or more clusters, one or more recommendations to address an issue described in the comments included in the respective cluster, wherein the one or more recommendations are generated based at least partly on the importance metric for the respective cluster; and
providing the one or more recommendations through an interface.

12. The method of claim 11, the method further comprising:
  determining a priority of addressing the issue associated with the respective cluster, the priority determined based on the importance metric of the respective cluster,
  wherein the one or more recommendations are based at least partly on the priority.

13. The method of claim 11, the method further comprising:
  determining an impact, to the software, of the issue associated with the respective cluster, wherein the one or more recommendations are based at least partly on the impact.

14. The method of claim 13, wherein the impact is determined through at least one machine learning algorithm.

15. The method of claim 11, wherein providing the one or more recommendations through the interface includes presenting the one or more recommendations through a user interface.

16. The method of claim 11, wherein providing the one or more recommendations through the interface includes providing the one or more recommendations through at least one application programming interface (API) that is accessed by one or more services.

17. The method of claim 11, the method further comprising:
  generating a name for each of the one or more clusters by applying natural language processing to the comments in the respective cluster.

18. The method of claim 11, the method further comprising:
  determining a usability issue type for each of the one or more clusters by applying natural language processing to the comments in the respective cluster; and
  determining a usability issue judgment for each usability issue type by applying the natural language processing to the comments in the respective cluster.

19. The method of claim 11, the method further comprising: determining, for the respective cluster, one or more of an associated screen and an associated use case.

20. One or more non-transitory computer-readable storage media storing instructions which, when executed by at least one processor, cause the at least one processor to perform operations comprising:
  receiving input data generated through usability testing of software, the input data including comments created by end-users interacting with the software;
  generating one or more clusters of the comments, each cluster including a subset of the comments that are semantically similar;
  determining a role fit metric for each of the end-users comprising:
    comparing characteristics of a respective end-user to characteristics of a previously determined persona, wherein the role fit metric for the respective end-user indicates a percentage degree of similarity between the characteristics of the respective end-user and the characteristics of the previously determined persona, and wherein the characteristics comprise one or more of an end-user role, a role description of responsibilities, a role-fit for a particular task, or a set of skills;
  calculating, for each of the one or more clusters, an importance metric for a respective cluster, wherein the importance metric is based on a proportion of the end-users that generated references to the comments in the respective cluster, and wherein the proportion is determined based on weighting the references of each of the end-users according to a percentage of the role fit metric of the respective end-user;
  generating, for each of the one or more clusters, one or more recommendations to address an issue described in the comments included in the respective cluster, wherein the one or more recommendations are generated based at least partly on the importance metric for the respective cluster; and
  providing the one or more recommendations through an interface.

* * * * *